United States Patent
Thione et al.

(10) Patent No.: US 7,562,385 B2
(45) Date of Patent: Jul. 14, 2009

(54) SYSTEMS AND METHODS FOR DYNAMIC AUTHENTICATION USING PHYSICAL KEYS

(75) Inventors: Giovanni L Thione, San Francisco, CA (US); Jonathan Trevor, Santa Clara, CA (US); David Hilbert, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 854 days.

(21) Appl. No.: 11/111,348

(22) Filed: Apr. 20, 2005

(65) Prior Publication Data

US 2006/0242692 A1 Oct. 26, 2006

(51) Int. Cl.
H04L 21/00 (2006.01)
(52) U.S. Cl. .......................................................... 726/9
(58) Field of Classification Search ...................... 726/9
See application file for complete search history.

(56) References Cited

U.S. PATENT DOCUMENTS

| 7,069,439 B1* | 6/2006 | Chen et al. .................. 713/172 |
| 2002/0108050 A1* | 8/2002 | Raley et al. .................. 713/193 |
| 2006/0043164 A1* | 3/2006 | Dowling et al. ............. 235/375 |

OTHER PUBLICATIONS

U.S. Appl. No. 11/111,106, Giovanni L. Thione.
Bruce Schneier, "Applied Cryptography Second Edition: protocol,a algorithms, and source code in C", 1996, John Wiley & Sons, USA.
RSA Security, "Protecting Against Phishing By Implementing Strong Two-Factor Authentication", RSA Security, Document No. PHISH WP 0904, 2004.
"Encentuate TCI Components", downloaded on or about Feb. 28, 2005 from www.encenuate.com/products/tci-components.htm.
RSA Smart Badging and RSA SecrilD USB Tokens: Securing Enterprise Resources, A White Paper for IT and business managers, Document No. SDSB WP 0903, 2003.
Bruce Chaput, Chris Carroll, "RSA SecurID Solutions: A Foundation for Enterprise Quality and Reliability", Document No. QUAL WP 1104, Nov. 19, 2004.
Electronics for Imaging Inc., "EFI PRINTME", downloaded on or about Mar. 14, 2005 from www.efi.com/products/printme/index. html, EFI, 2005.

(Continued)

Primary Examiner—Andrew L Nalven
(74) Attorney, Agent, or Firm—Sughrue Mion, PLLC

(57) ABSTRACT

A physical key is used to propose an association between a guest device and user information and services. Contact-based or contact-less connectors are used to establish the proposed association between the physical key and the guest device. The proposed association then communicated to the dynamic authentication system over a first communication channel. The dynamic authentication system determines a user confirmation over a second communications channel based on a user device and previously determined associations between users, user devices and the physical key. The guest device is then authenticated for access to information and/or services associated with the user. The information retrieved from and/or transmitted to the user's personal information repository is optionally protected using various transformations. Optional session identifiers supported on the physical key and/or the user device, ensure the protected information is inaccessible when the physical key is removed and/or the predetermined association with the user device is deleted.

40 Claims, 13 Drawing Sheets

OTHER PUBLICATIONS

"GOTOMYPC: Our Technology", downloaded on or about Mar. 14, 2005 from www.gotomypc.com.

Sten Lannerstrom, "Suntrust White Paper on Mobile Authentication", SUNTRUST, Document NO. MPM 02:00241 Revision A, Aug. 9, 2002.

David Colin, "NEC Wireless MT1065" product review downloaded from www.projectorcentral.com/wireless_nec_mt1065.htm, Jan. 31, 2003.

Selenty, "X-Micro Bluetooth USB Dongle" in PC Hardware Reviews, downloaded Jun. 6, 2003, from 222.pchardware.ro.

* cited by examiner

| USER IDENTIFIER | USER DEVICE IDENTIFIER | PHYSICAL KEY IDENTIFIER | GUEST DEVICE IDENTIFIER |
|---|---|---|---|
| GLTHIONE123 | PL87D5HJ7N | 34FCG87654321 2H | G65DREWSQ34678 |
| . | . | . | . |
| . | . | . | . |
| JTREVOR112 | 986HDGFR54 | K9765GGGSFDD98 | J9876HSS6543111D |

Fig. 4

| PHYSICAL KEY IDENTIFIER | OWNER | PASSWORD | SHARED SECRET | LAST ASSOCIATION TIME | LAST LOCATION |
|---|---|---|---|---|---|
| 19876 | GLTHIONE1 | BIOMETRIC.VOICE | A1 3B 24 6B 7B 2D | 30/12/2004 : 12:01:05 | PALO ALTO, CA USA |
| 19877 | GLTHIONE1 | BIOMETRIC.FINGERPRINT | C3 5BC 5E 8A 3F 5E | 30/12/2006 : 13:05:06 | FXPAL.COM |
| . | . | . | | | |
| 19801 | JTREVOR112 | BIOMETRIC.FINGERPRINT | F1 5B 74 BB 91 ED | 30/12/2004 : 14:31:26 | PALO ALTO, CA USA |

| DEVICE IDENTIFIER 1310 | DEVICE ADDRESS 1320 | USER 1330 | START 1340 | END 1350 | LOCATIONS 1360 |
|---|---|---|---|---|---|
| 1234 | IP:TELEVISION1. GLTHIONE1. COMCAST.COM | GLTHIONE1 | WEEKDAYS 08:00:00 | WEEKDAYS 17:00:00 | PALO ALTO, CA USA |
| 2345 | TELEPHONE: 14155551212 | GLTHIONE1 | */*/* 12:00:00 | */*/* 12:59:01 | * |
| 1099 | TELEPHONE: 16505551212 | JTREVOR112 | */*/* 12:00:00 | */*/* 12:59:01 | * |
| 1234567890 | MAC: F1-5B-74-BB-91-ED | JTREVOR112 | 30/12/2004 : 14:31:26 | 30/13/2004 : 14:31:26 | CA USA |

SYSTEMS AND METHODS FOR DYNAMIC AUTHENTICATION USING PHYSICAL KEYS

INCORPORATION BY REFERENCE

This Application is related to: entitled "SYSTEMS AND METHODS FOR A DYNAMIC USER INTERFACE PROXY USING PHYSICAL KEYS" by Giovanni L. THIONE et al., filed on an even date herewith, as U.S. patent application Ser. No. 11/111,106 herein incorporated by reference in its entirety.

BACKGROUND OF THE INVENTION

1. Field of Invention

This invention relates to authentication.

2. Description of Related Art

The security of computer systems and computer applications is of increasing concern to information security officers. Computer security systems protect against the mis-appropriation of personal, confidential and other sensitive information by protecting access to information sources. Conventional systems for increasing computer security may use non-obvious user identifiers, longer and/or more secure passwords, more frequent password changes and smartcards.

These conventional systems can make access for non-authorized personnel more difficult and typically require training for effective use. Moreover, these conventional systems can also make access more difficult for users. These conventional systems are therefore less likely to be widely deployed within ubiquitous computing environments.

SUMMARY OF THE INVENTION

Thus, systems and methods that provide dynamic authentication based on a physical key would be useful. The systems and methods according to this invention determine a user, a user device and previously determined first associations between a physical key, the user and/or a user device. A proposed dynamic association between a physical key and a guest device is communicated over a first channel or communications link. The proposed association is based on contact-based or contact-less connectors of the physical key. The system for dynamic authentication optionally validates the guest device against access control lists or other control procedures associated with the user and/or the physical key.

A user is associated with one or more user devices based on predetermined associations. A user login through a user device on a second channel confirms the proposed dynamic association between the physical key and the guest device. The guest device is authenticated for access to user information and services on the guest device. The authentication is optionally based on an authentication message transmitted from the system for dynamic authentication. The set of potential guest devices is optionally limited to devices previously identified by MAC, internet protocol (IP) address or the like. The association between a user and a user device may be implied or explicit. A user may further authenticate themselves via login key sequences, biometrics or the like. Dynamic verification of session tokens maintained by the physical key and the system for dynamic authentication provide for the protection of digital assets such as text, audio and video image information. The dynamic authentication may occur over the first or the second channels. The systems and method according to this invention also provide for the protection and/or transformation of information sent to the guest device. The protective and/or other transformations include, but are not limited to: transforming the information to a format or mode appropriate for the guest device, copy protecting the information, steganographic encoding, watermarking, encrypting and the like.

BRIEF DESCRIPTION OF THE DRAWINGS

FIG. 4 show an exemplary data structure for storing first associations according to this invention;

FIG. 5 is an expanded view of an exemplary data structure for storing physical key information according to this invention;

FIG. 6 is an exemplary data structure for storing access control information according to this invention;

DETAILED DESCRIPTION OF EXEMPLARY EMBODIMENTS

Figure 1:
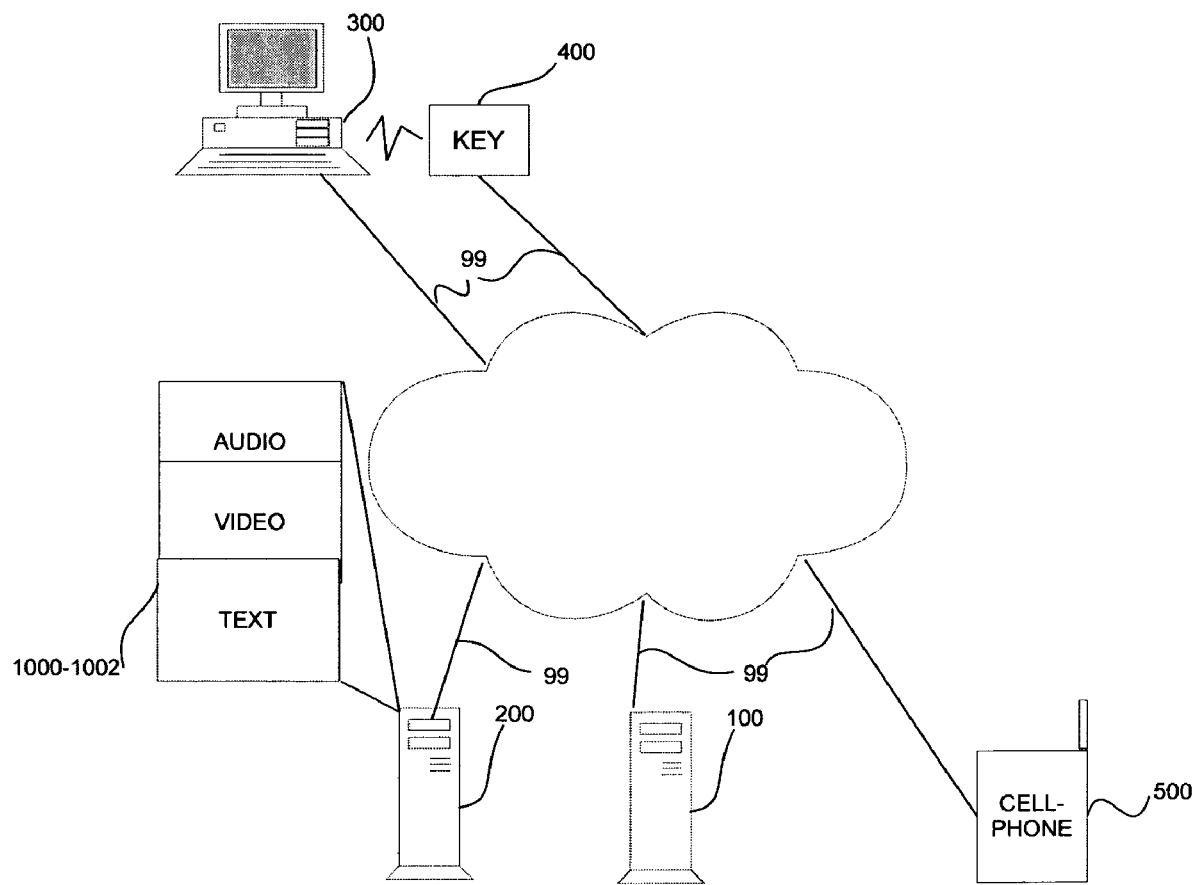
FIG. 1 is an overview of the use of an exemplary dynamic authentication system according to this invention.

FIG. 1 is an overview of the use of an exemplary dynamic authentication system 100 according to this invention. The dynamic authentication system 100 is connected via communications links 99 to: a communications-enabled personal computer guest device 300, a cell-phone user device 500 and an information repository 200 providing access to audio, video, and text based documents 1000-1002. A user proposes an association between a physical key 400 and the communications-enabled personal computer 300. The proposed association of the physical key 400 and the communications-enabled personal computer guest device 300 is based on contact-based or contact-less connectors of the physical key. The connectors associate the physical key with the guest device 300.

The contact-based connectors include, but are not limited to, universal serial bus connectors, Memorystick, SD card, serial, parallel and/or various other physical port connectors. The contact-less connectors include radio frequency identification tags, WiFi, WiMax, Bluetooth, bar code readers and/or any known or later developed contact-less connectors useable to associate the physical key 400 with the communications-enabled personal computer guest device 300.

The proposed association is communicated to the dynamic authentication system 100 via a first channel or communications link. The first channel is provided by the physical key 400 and/or by the guest device 300. In one exemplary embodiment according to this invention, the first channel is provided by the Ethernet connector of the communications-enabled personal computer 300. The physical key 400 is inserted into the USB port of the communications-enabled personal computer 300. Software codes are then executed and/or circuits activated to read the physical key identifier and/or information about the identifier. The physical key identifier and/or associations information is forwarded to the system for dynamic authentication 100 over the network connected to the communications-enabled personal computer 300.

Figure 2:
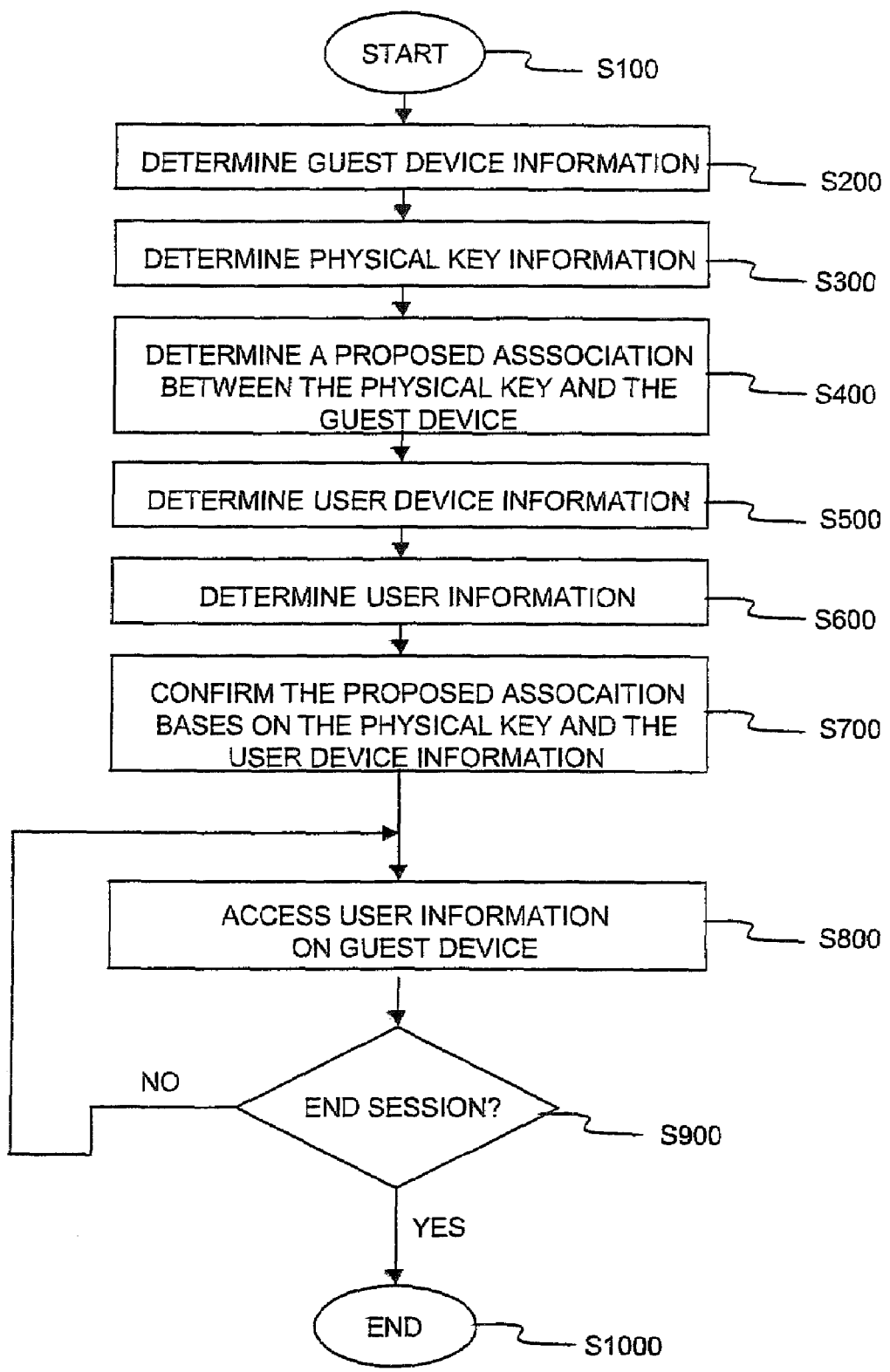
FIG. 2 is a flowchart of an exemplary method of dynamic authentication according to this invention.

FIG. 2 is a flowchart of an exemplary method of dynamic authentication according to this invention. The process begins at step S100 and immediately continues to step S200.

In step S200, the information about the guest device is determined. The guest device may be a television set in a home or a hotel, a radio, a computer, a projector, a photocopy machine, a telephone and/or any known or later developed input and/or output device. After the guest device has been determined, control continues to step S300 where a physical key is determined.

The physical key establishes connections to the guest device via contact-based or contact-less connectors. Contact-based physical keys are connected to guest devices through contact-based connectors that touch, interlock or otherwise directly connect. The contact-based physical connection ports include USB, serial, parallel, Memorystick and the like. Contact-less physical keys are connected to guest devices through contact-less connectors that do not directly connect or touch. Contact-less connectors include wireless media such as Bluetooth, WiFi, WiMax, General Packet Radio Service (GPRS), Radio Frequency Identification (RFID) tags and the like. It will be apparent that contact-less connectors based on longer range communications media such as WiMax, WiFi, GPRS and the like, are optionally based on signal strength indicators and the like. After the physical key has been determined, control continues to step S400.

In step S400, a proposed association between the physical key and a guest device is determined. The proposed association is based on the contact based or contact-less physical key. For example, a USB contact based connector embedded within a physical key is inserted into the USB receptacle of a guest device. The contact between the physical key and the guest device implicitly and dynamically associate between the physical key with the guest device. In other embodiments, a contact-less connector such as a RFID tag is used to propose a dynamic association with guest device. The proposed association is communicated over the first channel or communications link. The first channel may be embedded within the physical key and/or the guest device. After the proposed dynamic association between the physical key and the guest device has been determined, control continues to step S500.

In step S500, the user device information is determined. The user device information includes the type of device associated with a user, the MAC address, internet protocol (IP) and/or other network address identifier associated with the user device. In various other exemplary embodiments according to this invention, additional access control information is associated with each recognized device. The additional access control information is used to specify valid user devices based on time, location and/or various other attributes associated with user devices. The user device information for a valid cell-phone user device includes, but is not limited to a cell-phone network device identifier, the cell-phone telephone number, permitted access times for the cell-phone user device and the like. After the user device information has been determined, control continues to step S600 where the user information is determined.

In various embodiments according to this invention, the user information is implied based on third-party indicators of ownership. That is, the telephone company cell-phone ownership information is used to infer that the owner of the cell-phone device is the current user. However, in various other embodiments, the user is determined explicitly using a login key sequence, a smartcard or the like. After the user information is determined, control continues to step S700.

In step S700, the proposed dynamic association of the guest device and the physical key is confirmed by the user device over a second channel. For example, in one exemplary embodiment, a confirmation of the dynamic association is made by a telephone call from the user's office telephone. The caller-id information, when compared against access control lists for the user, indicates whether the office telephone is a valid user device. The user device information is in turn used to determine or select a voice print profile for the user. A challenge question is optionally posed to the user and the response analyzed. If the substance of the response and the voice print characteristics of the response match the stored information for the user, the proposed dynamic association with the guest device is confirmed. The guest device is then authenticated to receive services associated with the identified user. After the proposed dynamic association has been confirmed, control continues to step 800.

In step S800, the guest device is granted access to the information and/or services associated with the user. For example, in a hotel environment, the guest device might be a hotel television. The user interactions on the guest television and/or embedded media player operate as if they originated on the user's home television. Any interactive capabilities provided by the data service and supported by the guest device are supported. Thus, interactive internet protocol (IP) television is enabled via contact-less or contact-based connectors on the physical key, and/or embedded into the guest television. After and/or during the user interaction session, control continues to step S900 to determine if the dynamic association should be terminated.

The dynamic association session is terminated by a user logoff sequence, a timeout, programmatically or the like. The termination of the dynamic association de-authenticates the guest device for access to the information and services associated with the user. For example, in one embodiment, the dynamic association continues until explicitly terminated using a logoff sequence or the like. In other exemplary embodiments, the dynamic association continues only while the physical key is present and communicating session verifiers to the system for dynamic authentication. It will be apparent that in still other exemplary embodiments according to this invention, the session identifier may be communicated between the user device and the system for dynamic authentication over the second channel or communications link.

In still other embodiments according to this invention, session identifiers, cookies or the like are issued to the physical key and verified at various time intervals. The severing of the dynamic association between the physical key and an associated guest device renders the session identifier inaccessible for session verification. The dynamic association may be severed by withdrawing the physical key from contact with the port or receptacle. Dynamic associations established using contact-less connectors are terminated using a "break-contact" button on the key, withdrawing the physical key from the sensing range of the guest device and the like. However, it should be apparent that various known or later developed methods of terminating or severing the dynamic association may be used without departing from the scope of this invention. The system for dynamic authentication then terminates the unverifiable sessions and re-writes/de-authenticates the guest device. After the session is verified, control jumps to step S800 and access to the user information continues. Steps S800-S900 are repeated until it is determined in step S900 that the session should be terminated. Control then continues to step S1000 and the process ends.

Figure 3:
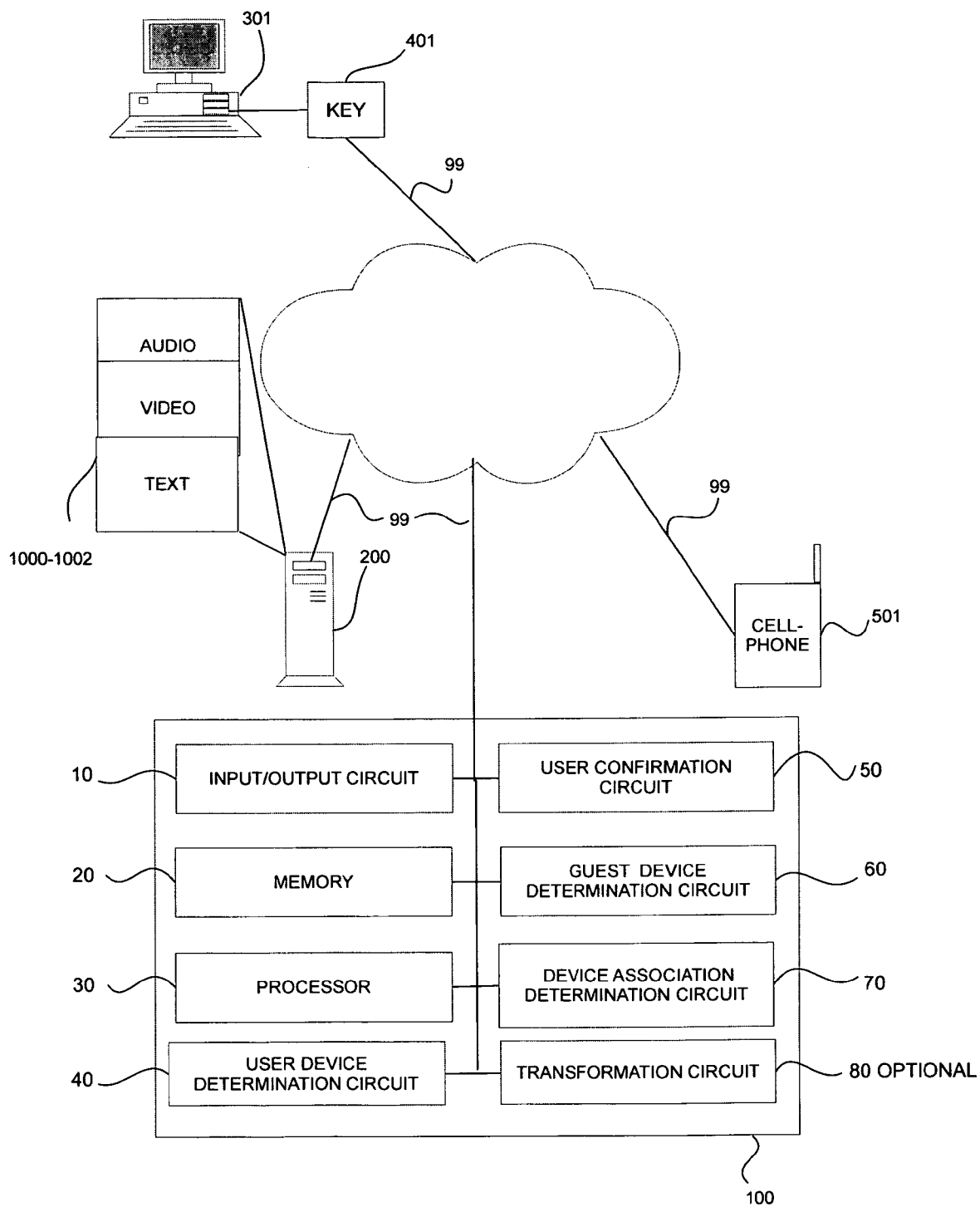
FIG. 3 is an exemplary system for dynamic authentication according to this invention.

FIG. 3 is an exemplary system for dynamic authentication 100 according to this invention. The system for dynamic authentication 100 comprises: a memory 20; a processor 30; a user device determination circuit 40; a user confirmation circuit 50; a guest device determination circuit 60; a device association determination circuit 70; and an optional transformation circuit 80; each connected to input/output circuit 10 and via communications links 99 to: a personal computer guest device 301; a physical key 401; the cell phone user device 501 and an information repository 200 containing audio, video, text and other documents 1000-1002.

The user creates a proposed association with a guest device by placing the user's physical key within a sensing distance of the personal computer guest device 301 or by inserting the physical key 401 into a receptacle within the personal computer guest device 301. For example, a physical key 401 supporting an IEEE 1394 communications link is inserted into the IEEE 1394 port of the personal computer guest device 301. The physical key 401 and/or the personal computer guest device 301 transmit information about a proposed dynamic association over a first channel, to the input/output circuit 10 of the dynamic authentication system 100.

The processor 10 activates the guest device determination circuit 60 to identify the MAC address, IP address, telephone device identifier or other identifier associated with the personal computer guest device 301. For example, in embodiments in which the personal computer guest device 301 forwards the proposed dynamic association information, the internet protocol (IP) address is contained within the received information packets. Alternately, where the physical key provides a communications link to the system for dynamic authentication 100, the guest device is accessed and validated against the IP address or identifier associated with the physical key. However, it should be apparent that any known or later developed method of transmitting the identifier associated with the guest device may be used in the practice of this invention.

The processor 30 activates the device association determination circuit 70. The device association circuit 70 determines the user associated with the physical key 401 indicated by the proposed association. The physical key 401 is identified by a physical key identifier and associated with a callphone user device 501. In various exemplary embodiments according to this invention, user devices and/or users are in turn associated with access control lists. The access control lists of MAC, IP and/or other device identifiers. The access control lists are useful in limiting the pool of valid devices that can be associated with a physical key. In various other embodiments, the access control lists are used to control authentication based on the time of day, location and/or various other attributes, access patterns or features.

The processor 30 activates the user device determination circuit 40 to verify that the cell-phone user device 501 is associated with the physical key 401. The processor 30 may also verify that the cell-phone user device 501 is valid based on one or more user specific access control lists. For example, a user specific access control list validates all IP addresses associated with the company domain during working hours. In contrast, the IP addresses associated with the devices in the user's home network are authorized for access at all times. Geographic information provided by some networks is used to conform device access to acceptable usage parameters.

The user confirmation circuit 50 is then activated. In one embodiment, the user confirmation circuit 50 initiates a count-down timer. A confirmation of the proposed association between the guest device and the physical key must be received over the second channel during the interval specified by the count-down timer. If a valid confirmation of the proposed dynamic association is received, the personal computer guest device 301 is authenticated by the processor 30, to access to the user's personal information repository 200 containing audio, video and/or text information.

In various exemplary embodiments, the processor 30 activates the optional transformation circuit 80. The optional transformation circuit 80 copy-protects, watermarks and/or otherwise transforms user digital information into protected digital assets. The protected digital assets are then forwarded to the personal computer guest device 301. Code, routines or circuits in the physical key 401 decode the protected digital assets for access by the user. Even if the protected asset is in-advertently left on the personal computer guest device 301, the transformed digital assets are un-useable without the physical key 401.

In still other exemplary embodiments, the decoding or decryption of a protected digital asset requires the verification of session identifiers. Moreover, even if the user loses the physical key 401, access to the protected assets is denied by removing the physical key 401 from association with the user. No valid session identifier is returned. In this way, the user is able to view personal and/or other information on ubiquitous devices without risk of losing control of the information. In will be apparent that in various embodiments according to this invention, the system for dynamic authentication may be embedded within an information repository, a digital library, a web server or the like, embedded within a laptop computer or other guest device and/or placed at any location accessible via communications links 99.

FIG. 4 show an exemplary data structure for storing first associations 1100 according to this invention. The exemplary data structure for storing first associations 1100 is comprised of a user identifier portion 1110; a user device identifier portion 1120; a physical key identifier portion 1130; and a guest device identifier portion 1140.

The first row contains the value "GLTHIONE123" in the user identifier portion 1110. This value uniquely identifies the user to the system for dynamic authentication. The user identifier value may be a global identifier such as an email address, a local identifier or any other information that uniquely identifies the user to the system.

The user device identifier portion 1120 of the data structure for storing associations 1100 contains the value "PL87D5HJ7N". This value uniquely identifies the user device to the system for dynamic authentication. The user device identifier value may be a MAC address, a dynamic or static internet protocol (IP) address and/or any other known or later developed identifier useful in uniquely identifying the user device to the system.

For example, user devices include, but are not limited to, cell-phones, communication-enabled personal digital assistants (PDA), paper based bar codes, Radio Frequency Identification (RFID) tags and/or the any known or later developed device capable of dynamically confirming a proposed association between a physical key and a guest device.

The physical key identifier portion 1130 contains the value "34FCG876543212H". This value uniquely identifies a physical key to the system. The physical key identifier value is a MAC address, an IP address, a telephone device network identifier and/or any other known or later developed identifier capable of identifying the physical key. The physical key connects to a guest device via a contact based or a contact-less connector. In various exemplary embodiments, the contact connector is based on Universal Serial Bus (USB), Memory-stick, Smart Media, Compact Flash, Multi Media Card, Secure Digital Card, XD-Picture Cards, serial or parallel connectors or the like. A contact-less connector can be based on RFID, Bluetooth, infra-red, WiFi, WiMax and/or any known or later developed type of connector not requiring a physical connection.

The physical key is used to propose dynamic associations between guest devices. Thus, in one exemplary embodiment, a user carrying a contact-less physical key communicates the proposed dynamic association to the system for dynamic authentication over a first communications channel. The first channel or communications link may be Ethernet, Bluetooth, WiFi, WiMax and/or any other type of communications medium without departing from the scope of the invention. The first channel or communication link to the dynamic authentication system utilize can be a communications link directly available in the guest device and/or a communications link embedded or available through the physical key.

The proposed association between a guest device and a physical key is confirmed via a second communications channel. The dynamic authentication system authenticates the guest device for access to services and/or devices that are associated with the user. In various embodiments, the dynamic authentication system forwards the authentication message directly to the personal information repository. However, it will be apparent that in still other embodiments, the authentication service acts as a proxy and mediates access to the personal information repository directly.

For example, in one embodiment, the dynamic authentication system is used to authenticate a hotel's Mitsubishi WD-52725 television as a guest device. The guest device receives access to a vacation video streamed from the user's personal information repository. The proposed association between the user's physical key and the hotel's television is established by plugging the IEEE-1394 based physical key into the IEEE-1394 inter-connect on the Mitsubishi WD-52725 television guest device. The physical key also includes an embedded WiFi communications link. The physical key establishes a communication link over the Hotel's in-room WiFi system to the dynamic authentication system and transmits the proposed association between the physical key and the hotel's television.

The guest device identifier portion 1140 contains the value "665DREWSQ3478". This value indicates a unique device identifier associated with the guest device. If the guest device is communications-enabled, the value of the guest device identifier may be a MAC, IP or other identifier. In other embodiments, in which the communications link is embedded in the physical key, the guest device identifier may be based on the device model number, the manufacturer and/or other identifiers associated with the network address of the physical key. Thus, a Mitsubishi WD-52725 television accessible only via a WiFi-enabled physical key is assigned the guest device identifier "192.168.1.32:001.WD-52725.TV.mitsubishi.com". This indicates that the physical key accessible over the non-routable address "192.168.1.32" proxies or mediates communications for the television device.

The user then calls the dynamic authentication system via a user-associated cell-phone to confirm the association between the hotel television and the physical key. The dynamic authentication system verifies the previously stored association between the user, the user device and the physical key. The dynamic authentication system authenticates the hotel television guest device for access to the user's personal information repository. The dynamic authentication system and the physical keys thereby provide dynamically available ubiquitous access to the user's personal services and/or information.

FIG. 5 is an expanded view of an exemplary data structure for storing physical key information 1200 according to this invention. The data structure is comprised of a physical key identifier portion 1210; a user portion 1220; a password portion 1230; a shared secret portion 1240; a last association time portion 1250 and a last location portion 1260.

The physical key identifier portion 1210 of the first row contains the value "19876". This value uniquely identifies the physical key within the system for dynamic authentication. It will be apparent that the physical key identifier may be based on a MAC address, an internet protocol (IP) address and/or any other identifier capable of uniquely identifying a physical device.

The user portion 1220 contains the value "GLTHIONE1". This value indicates the user identifier of the key owner. The user identifier may be an internet email address or any other identifier that uniquely identifies the user to the system for dynamic authentication.

The password portion 1230 of the data structure for physical key information contains the value "BIOMETRIC.VOICE". This value indicates that the voiceprint and an optional set of challenge questions used to validate the user.

The optional shared secret portion contains the value "A1 3B 24 6B 7B 2D" reflecting a copy of a secret used to optionally encrypt communication between the physical key, the system for dynamic authentication and the user's personal information repository and/or services. It will be apparent that in various other embodiments, public key cryptography and the like can also be used without departing from the scope of this invention.

The last association time portion 1250 contains the time of the last dynamic association with a guest device. Thus the value "30 Dec. 2004: 12:01:05" indicates that the last guest device was dynamically associated with a physical key and a user service on Dec. 30, 2004 at 12:01:05 UTC. The last association time is optionally used to reduce the risk of proposed associations based on copies of a user's physical key. For example, even if a physical key is stolen or copied, a constraint can be imposed on new dynamic associations. In one embodiment, a user confirmation must be received within a 60 second window following a proposed dynamic association. This makes it difficult to use a stolen physical key without the associated user device since the timing of the proposed dynamic authentication must also be known. It will be apparent that other constraints such as geographic limitations ownership, usage patterns and the like may also be used to constrain the group of guest devices valid with a physical key or user. Moreover, once the theft of the physical key is detected by repeated proposed authentications outside of normal usage or the like. The physical key is then removed from association with the user and the user device rendering the physical key in-operative.

A copied physical key can be used to propose a dynamic association but requires that a valid user device confirm the proposed association. A timer based on the last association value, in conjunction with the values in the last location time portion 1260 are useful in detecting multiple attempted physical key authentications within a short time period and/or from widely disparate locations. For example, the exemplary value "PALO ALTO Calif. USA" is compared to the geographic location associated with the second physical key access and the time are compared. If the physical locations are widely separated and the proposed associations were close in time, the physical key is de-activated.

The second row contains the values "19877", "PSMITH5", "BIOMETRIC.FINGERPRINT", "A1 3 24 6B 7B 2D", "30 Dec. 2005: 13:05:06", and "FXPAL.COM". These values indicate that user "PSMITH5" is associated with a physical key value of "19877" and that a biometric fingerprint is on record and can be used to verify the user. The specified shared secret value can be used to encrypt forwarded information. The value in the last association time portion 1250 and the last location portions 1260 are useful in identifying out of pattern usage of the physical key.

The last row contains the values "19801", "JTREVOR112", "BIOMETRIC.FINGERPRINT", "F1 5B 74 BB 91 ED", "30 Dec. 2004: 14:31:26", and "PALO ALTO, Calif. USA". These values indicate that user "JTREVOR112" is associated with a physical key value of "19801". A biometric fingerprint can be used to verify the user and a shared secret value can be used to encrypt forwarded information. The values in the last association time portion 1250 and the last location portions 1260 can be used to detect physical key pattern usage variations.

FIG. 6 is an exemplary data structure for storing access control information 1300. The data structure for storing access control information 1300 is comprised of a device identifier portion 1310; a device address portion 1320; a user portion 1330; a start portion 1340; an end portion 1350 and a locations portion 1360.

The first row of the exemplary data structure for storing access control information 1300 contains the values "1234" in the device identifier portion 1310. This value uniquely identifies the device within the system for dynamic authentication.

The value "IP:TELEVISION1.GLTHIONE1.COMCAST.COM" in the device address portion 1320 reflects the address of the specified device within the network. The device address may reflect static addresses such as static internet protocol addresses, an address label, an alias such as a domain name or the like.

The value "GLTHIONE1" in the user portion 1330 reflects an authorized user of the device. In some embodiments, the value in the user portion reflects the owner of the device. For example, a cell-phone owner is generally always authorized to use the device. However, if the cell-phone device is lost, updating the information in the user portion 1330 is used to indicate an in-valid device prohibited from confirming proposed dynamic authentications.

The value "WEEKDAYS 08:00:00" in the start portion 1340 reflects the beginning of the validity period for the device. Thus, the value indicates the device validity will begin every weekday at 8:00 AM. Similarly the "WEEKDAYS 17:00:00" value in the end portion 1350 indicates the end of the validity period for the device. Thus, the device will be a valid accessible device each weekday from 8:00 to 5:00 PM UTC.

The value "PALO ALTO, Calif." in the locations portion 1360 contains the valid access locations for the device. In some cases, internet protocol address and/or other network identifiers provide an indication of geographic origination. In these cases, the value in the locations portion 1360 is used to constrain access to devices originating from the specified location. It will be apparent that in various other exemplary embodiments according to this invention, the location information is encoded using latitude/longitude and/or any known or later developed geographic or location identification information.

The second row contains the values "2345" "TELEPHONE:14155551212", "GLTHIONE1", "*/*/* 12:00:01", "*/*/* 12:00:00" and "*". These values indicate that the telephone device at 415-555-1212 identified as device "2345" is associated with user "GLTHIONE1". The telephone device is valid for access starting on any day at 12:00:01 UTC and continuing until 12:00:00:00 UTC as indicated by the values in the start portions 1340 and the end portions 1350 respectively. The device is valid for access from any location as indicated by the "*" wildcard character.

The second to last row contains the values "1099", "TELEPHONE:16505551212", "JTREVOR112", "*/*/* 12:00:01", "*/*/* 12:00:00" and "*". These values indicate that the telephone device at 415-555-1212 identified as device "2345" is associated with user "JTREVOR112". The telephone device is valid for access starting on any day at 12:00:01 UTC and continuing until 12:00:00:00 UTC as indicated by the start end portions 1340-1350 respectively. The device is valid for access from any location.

The last row contains the values "1234567890", "MAC:F1-5B-74-BB-91-ED", "JTREVOR112", 30/12/2004 14:31:26", "30/13/2004 15:31:26" and "CA USA". These values indicate that the device accessible at device address "MAC:F1-5B-74-BB-91-ED", identified as "1234567890" is associated with user "JTREVOR112". The device is valid for access starting on Dec. 30, 2004 at 14:31:26 UTC as indicated by the start portion 1340 and continuing until Dec. 30, 2004 at 15:31:26 UTC as indicated by the end portion 1350. The device is valid for access from the state of California in the United States of America only.

Figure 7:
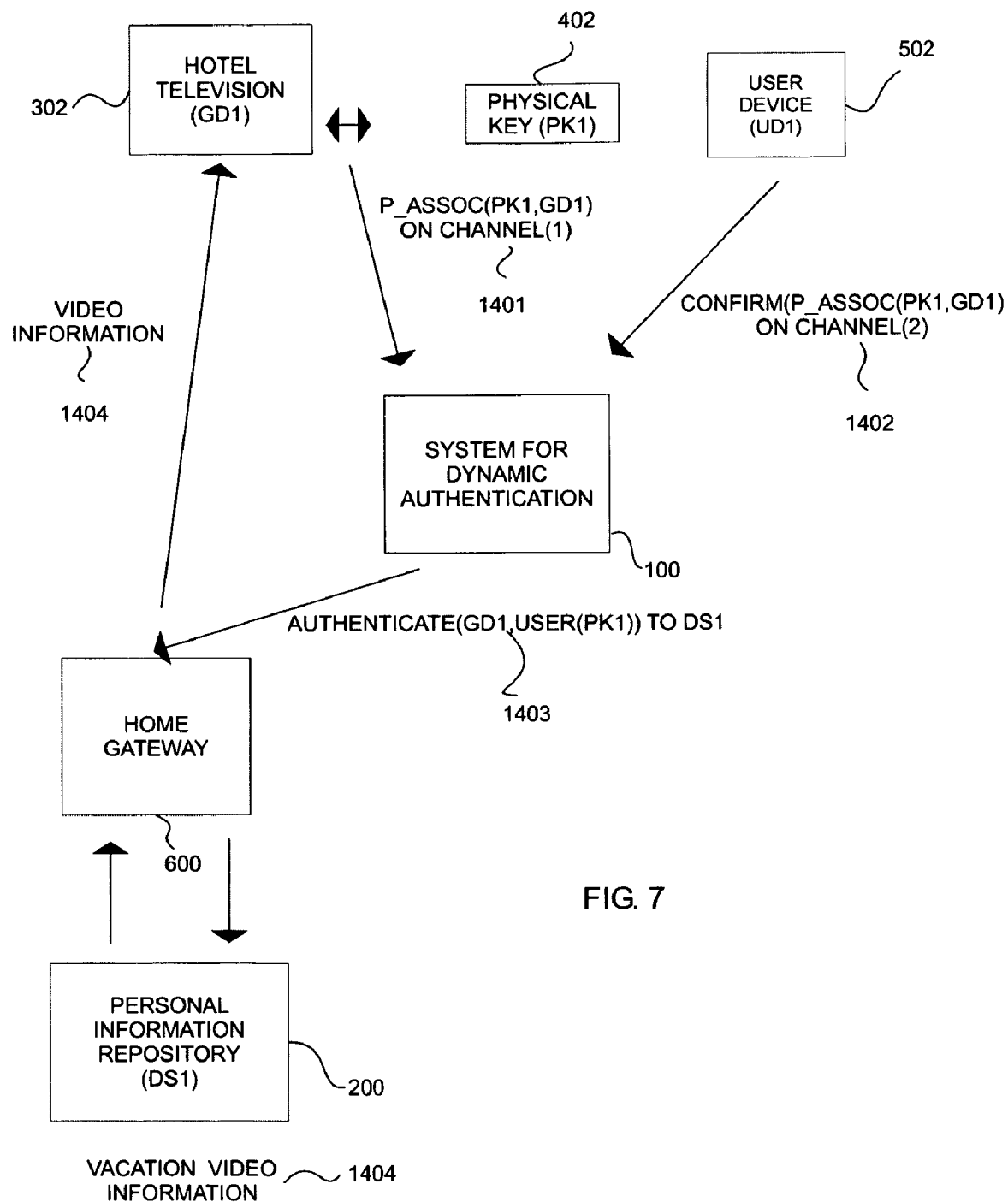
FIG. 7 is an exemplary overview of the flow of information according to this invention.

FIG. 7 is an exemplary overview of the flow of information according to this information. A user of physical key 402 places the physical key 402 within the sensing distance of a guest device 302. For example, a guest device 302 may sense a proposed association by detecting an RFID tag embedded in the physical key. Alternately, the physical key 402 may sense the presence of the guest device 302. An optional key switch on the physical key 402 is useable to actively accept and/or reject proposed dynamic associations with guest devices. In other embodiments, physical coupling of the physical key 402 to the guest device 302 based on USB, IEEE 1394, Memorystick, SD cards, serial and parallel port connectors and the like, is used to indicate a proposed dynamic association with the physical key 402.

The proposed association is communicated to the dynamic authentication system 100 over a first channel or communications link. The first channel is associated with the guest device 302 or may be provided by the physical key 402. For example, a hotel television device may be connected via a hotel network to the internet. If the device is capable of using the hotel network, the proposed association may be sent over the hotel network-internet communications link. However, if the hotel network is not useable and/or accessible, then the physical key may provide the communications link via a WiFi, WiMax, GPRS or other communications medium built into the physical key 402.

A user device 502 confirms the proposed association over a second communications link. The user device 502 may be a cell-phone, a Blackberry device and/or any other type of user device use-able to confirm the proposed association over a second communication channel. The system for dynamic authentication 100 uses optional access control lists to adjust the group of valid user devices from which a confirmation may be received. Moreover, in various other embodiments according to this invention, security is further increased by initiating call-backs to the user device.

The system for dynamic authentication 100 receives the proposed association between the guest device 302 and the physical key 402. The physical key 402 and/or information about the physical key 402 is used to identify the user associated with the physical key 402. The valid user devices associated with the user are then determined. The user device 502 which generates the confirmation over the second channel, is checked against the list of valid user devices associated with the physical key 402. If the user device 502 is a valid user device, an optional authentication message is sent to the user's personal information repository 200 via the home portal or gateway 600.

In various other embodiments, other data services or information repositories associated with the user receive the authentication message. The authentication message may be used to grant access to the vacation video 1404 of a user via the guest device 302 dynamically associated with the physical key 402. It will be apparent that in various other embodiments according to this invention, access to various other types of information, services and/or devices may also be provided without departing from the scope of this invention.

After user access via the hotel television guest device 302 has been granted, the user may operate the hotel television as though she were in front of her home television. That is, the volume and/or other controls are mapped to the controls of the hotel television. In this way, the user is able to review requested information on ubiquitously available devices within the hotel room. Moreover, the user interface of the existing television device need not be re-mapped.

Figure 8:
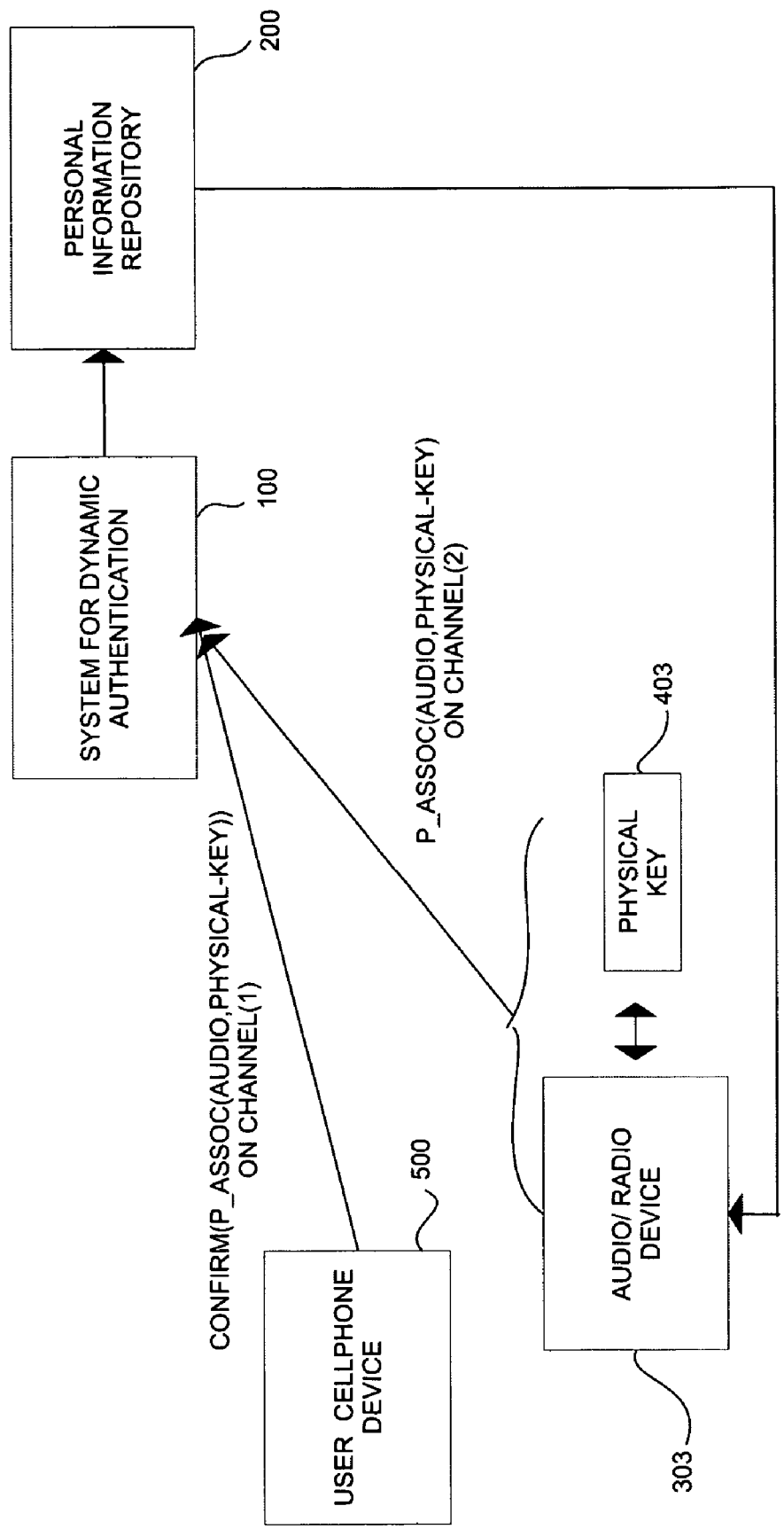
FIG. 8 is a first overview of the use of an exemplary dynamic authentication system according to this invention.

FIG. 8 is a first overview of the use of an exemplary dynamic authentication system 100 according to this invention. The user of the physical key 403 proposes a dynamic association with an audio guest device 303. The user proposes the association by placing the physical key 403 within the sensing distance of the audio guest device 303. The proposed association "P_ASSOC(AUDIO,PHYSICAL-KEY)" is communicated over a first communications channel to the system for dynamic authentication 100. The user then confirms the proposed association "CONFIRM(P_ASSOC(AUDIO,PHYSICAL-KEY) over a second communications channel. It will be apparent that the first and second communication channels may utilize the same communications links but with different encryption or encoding mechanisms; different times; or may use different communications medium.

In various other embodiments, the identifiers of guest devices and/or user devices are validated against access control lists. The access control lists are useful in validating or excluding groups of devices from candidacy for proposed association. An access control list may be used to validate all devices associated with a corporation, a subnet associated with a workgroup or any other identifiable group. Alternatively, portions of the internet protocol address space associated with the user's home network may be validated for access.

The dynamic authentication system 100 receives the confirmation of the proposed dynamic association. The dynamic authentication system 100 authenticates the audio guest device 303 to receive information from the user's personal information repository 200. For example, a network enabled media adaptor type of audio guest device, associated with the user's physical key, receives digital audio assets such as MP-3 files from the user's information repository. The digital audio assets are optionally protected using copy-protection transformations, watermarking and the like. This allows the user to use the digital assets in ubiquitously available devices while appropriately securing the information.

In various other exemplary embodiments according to this invention, a low-power FM transmitter and a WiFi connection are embedded into the physical key. In this embodiment, the physical key can be used to enable access to the user's digital audio files from FM or other radios. This allows the user to travel with access to their personal audio collection wherever a WiFi or other communications link is available.

Figure 9:
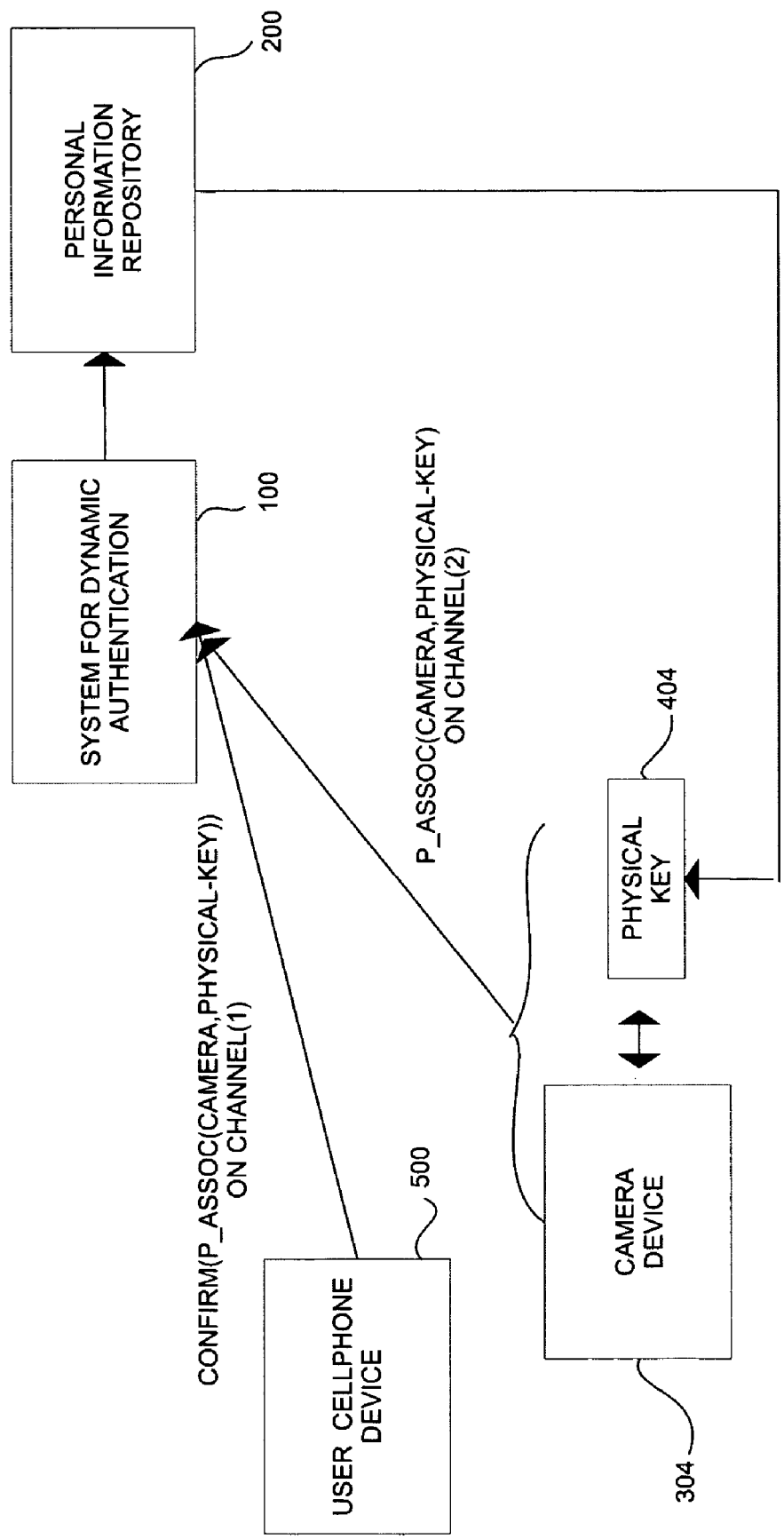
FIG. 9 is a second overview of the use of an exemplary dynamic authentication system according to this invention.

FIG. 9 is a second overview of the use of an exemplary dynamic authentication system 100 according to this invention. The user of the physical key 404 proposes an association with a camera guest device 304. The user proposes the dynamic association by placing the physical key 404 within the sensing distance of the camera guest device 304. The proposed association "P_ASSOC(CAMERA,PHYSICAL-KEY)" is communicated over a first communications channel to the system for dynamic authentication 100. The user confirms the proposed association "CONFIRM(P_ASSOC(CAMERA,PHYSICAL-KEY) over a second communications channel. It will be apparent that the first and second communication channels may utilize the same communications links but with different encryption or encoding mechanisms; different times; or may use different communications medium.

In various other embodiments, the identifiers of guest devices and/or user devices are validated against access control lists. The access control lists are useful in validating or excluding groups of devices from candidacy for proposed association. An access control list may be used to validate all devices associated with a corporation, a subnet associated with a workgroup or any other identifiable group. Alternately, portions of the internet protocol address space associated with the user's home network are validated for access.

The dynamic authentication system 100 receives the confirmation of the proposed association. The dynamic authentication system 100 authenticates the camera guest device 304 to receive information from the user's personal information repository 200. For example, the user may borrow a friend's camera by placing the physical key 404 into the USB or SD card slot of the camera guest device 304.

In one exemplary embodiment, the physical key also contains a WiFi, GPRS or other communications link. After taking pictures with the camera guest device 304, the digital pictures are saved on the camera guest device 304. The stored pictures are later synchronized with the user's information repository or transmitted over the WiFi, GPRS, or other communications medium embedded in the physical key. It will be apparent that the communications link of a communications-enabled camera may also be used without departing from the scope of this invention. The digital picture assets are optionally protected using copy-protection transformations, watermarking and the like. This allows the user to use the digital assets in ubiquitously available devices while appropriately securing the information.

Figure 10:
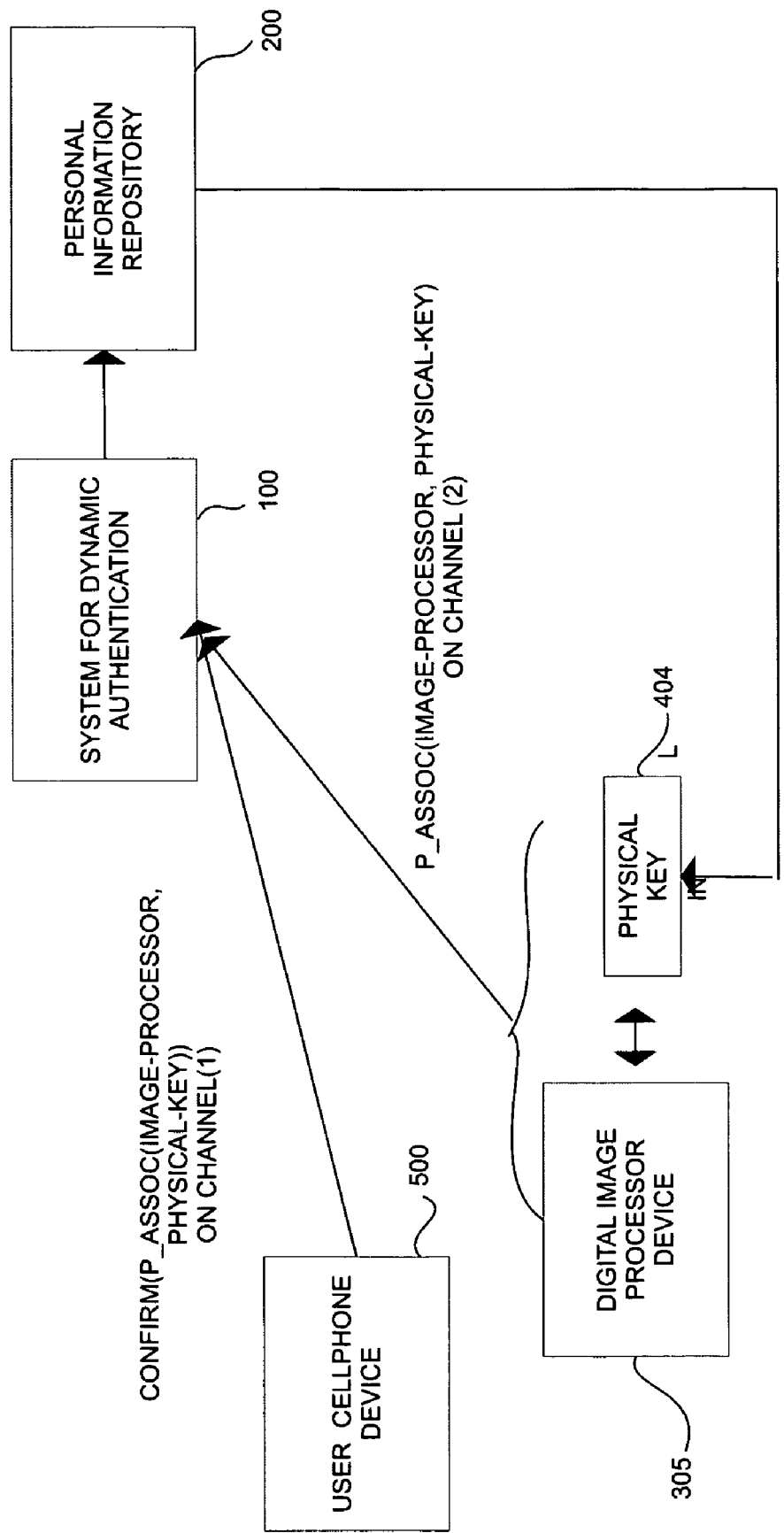
FIG. 10 is a third overview of the use of an exemplary dynamic authentication system according to this invention.

FIG. 10 is a third overview of the use of an exemplary dynamic authentication system 100 according to this invention. The user of the physical key 404 proposes an association with a digital image processing device 305. The user proposes the association by placing the physical key 404 within the sensing distance of the digital image processing device 305. The proposed association "P_ASSOC(IMAGE-PROCESSOR, PHYSICAL-KEY)" is communicated over a first communications channel to the system for dynamic authentication 100.

The user confirms the proposed association "CONFIRM (P_ASSOC(IMAGE-PROCESSOR, PHYSICAL-KEY)

over a second communications channel. It will be apparent that the first and second communication channels may utilize the same communications links but with different encryption or encoding mechanisms; different times; or may use different communications medium.

The dynamic authentication system 100 receives the confirmation of the proposed association. The dynamic authentication system 100 authenticates the digital image processor device 305 to receive information from the user's personal information repository 200. For example, the digital image processor associated with the user's physical key 404 receives digital film or pictures uploaded from a borrowed or guest camera. The digital pictures taken with borrowed or guest cameras are uploaded to the user's personal information repository 200. The digital pictures are optionally protected using copy-protection transformations, watermarking and the like. This allows the user to use the digital assets in ubiquitously available devices while appropriately securing the information.

The authenticated digital image processor guest device 305 retrieves the digital pictures from the user's personal information repository 200. The pictures are then printed on the high quality photographic digital image processor. The user is able to obtain the desired high quality photographic prints without any unnecessary waiting. The digital image processor is able to keep the digital image processor running at higher capacity with lower overhead due to the self service nature of the job.

Figure 11:
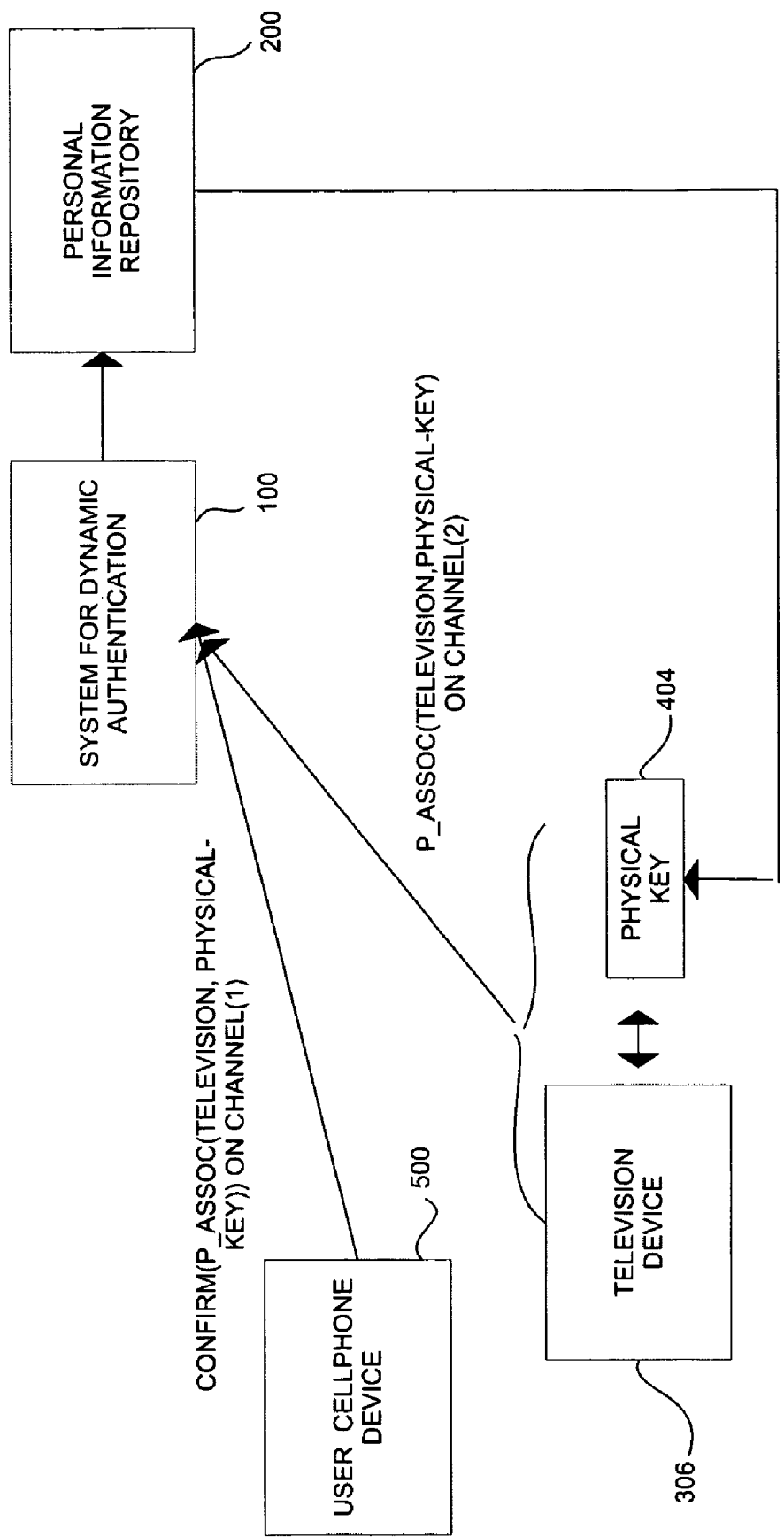
FIG. 11 is a fourth overview of the use of an exemplary dynamic authentication system according to this invention.

FIG. 11 is a fourth overview of the use of an exemplary dynamic authentication system 100 according to this invention. The user of the physical key 404 proposes an association with television guest device 306. The user proposes the association by placing the physical key 404 within the sensing distance of the audio guest device 306. The proposed association "P_ASSOC(TELEVISION, PHYSICAL-KEY)" is communicated over a first communications channel to the system for dynamic authentication 100. The user confirms the proposed association "CONFIRM(P_ASSOC(TELEVISION, PHYSICAL-KEY) over a second communications channel. It will be apparent that the first and second communication channels may utilize the same communications links but with different encryption or encoding mechanisms; different times; or may use different communications medium.

The dynamic authentication system 100 receives the confirmation of the proposed association. The dynamic authentication system 100 authenticates the television device 306 to receive information from the user's personal information repository 200. For example, a network enabled television guest device associated with the user's physical key receives digital video information such as MP-4 files from the user's information repository 200. The digital video information is optionally protected using copy-protection transformations, watermarking and the like. This allows the user to use the digital information on ubiquitously available devices while appropriately securing the information.

Figure 12:
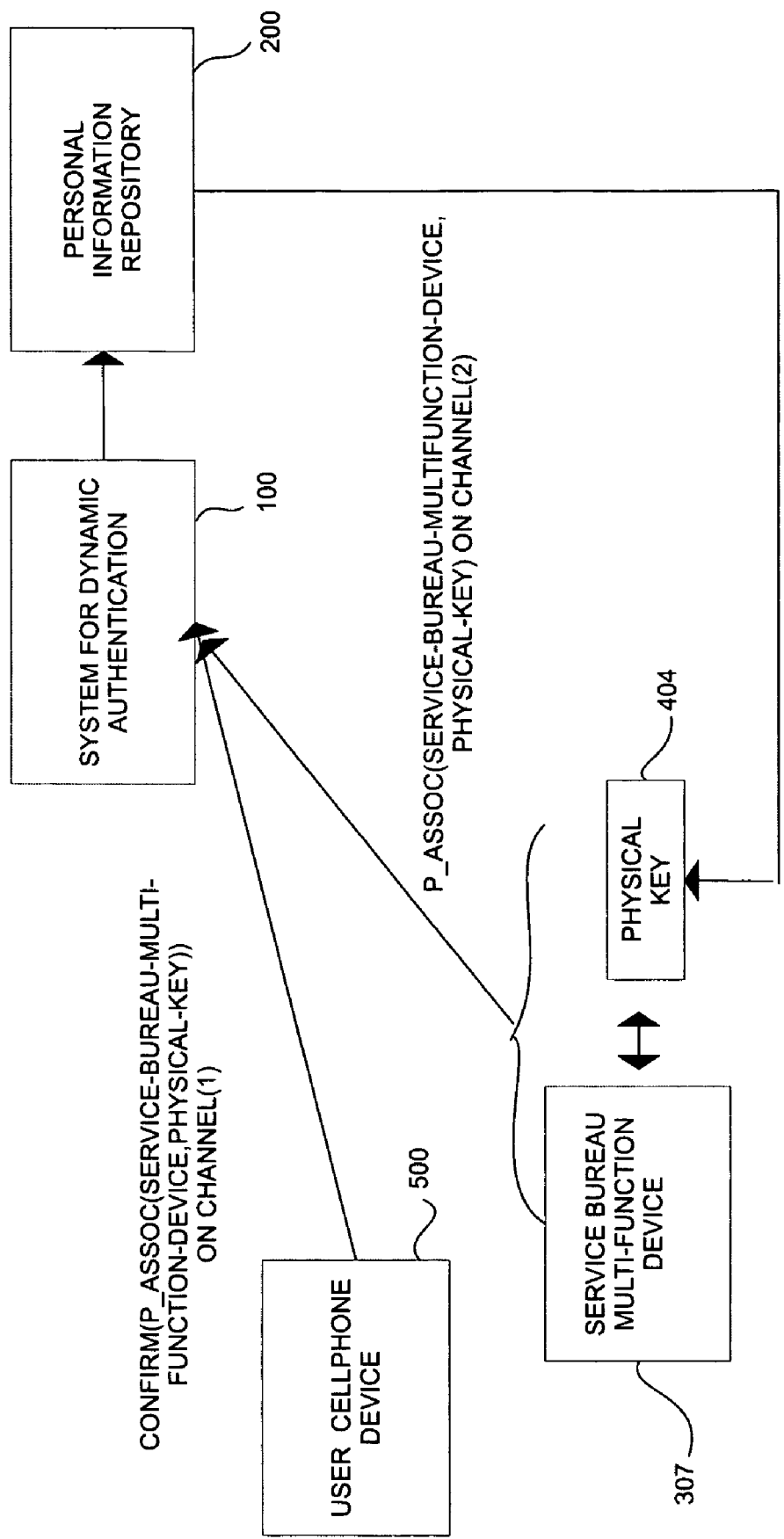
FIG. 12 is a fifth overview of the use of an exemplary dynamic authentication system according to this invention.

FIG. 12 is a fifth overview of the use of an exemplary dynamic authentication system 100 according to this invention. The user of the physical key 404 proposes an association with a service bureau guest device 307. The user proposes the association by placing the physical key 404 within the sensing distance of the service bureau multi-function device 307. The proposed association "P_ASSOC(SERVICE-BUREAU-MULTIFUNCTION-DEVICE, PHYSICAL-KEY)" is communicated over a first communications channel to the system for dynamic authentication 100. The user confirms the proposed association "CONFIRM(P_ASSOC(SERVICE-BUREAU-MULTIFUNCTION-DEVICE,PHYSICAL-KEY) over a second communications channel. It will be apparent that the first and second communication channels may utilize the same communications links but with different encryption or encoding mechanisms; different times; or may use different communications medium.

The dynamic authentication system 100 receives the confirmation of the proposed association. The dynamic authentication system 100 authenticates the service bureau's multi-function guest device 307 to receive information from the user's personal information repository 200. For example, a large printing and binding job is quickly facilitated via self service since the information can remain in digital form across the production facility. That is, the user need only select desired options, associate their physical key 404 with the high volume printer/binder and confirm the association via the user device 500. The selected document is quickly retrieved in digital form, appropriately transformed for the printer/binder job, printed and bound. In optional embodiments, sensitive documents are encrypted and only decrypted at print time. Session identifiers are used to ensure that stored copies of the protected assets can be accessed only in association with the physical key 404. When the printing/binding job is finished, the physical key is removed. Any stored copies of the protected assets become inaccessible due to the inaccessibility of the session identifiers stored on the physical key.

Figure 13:
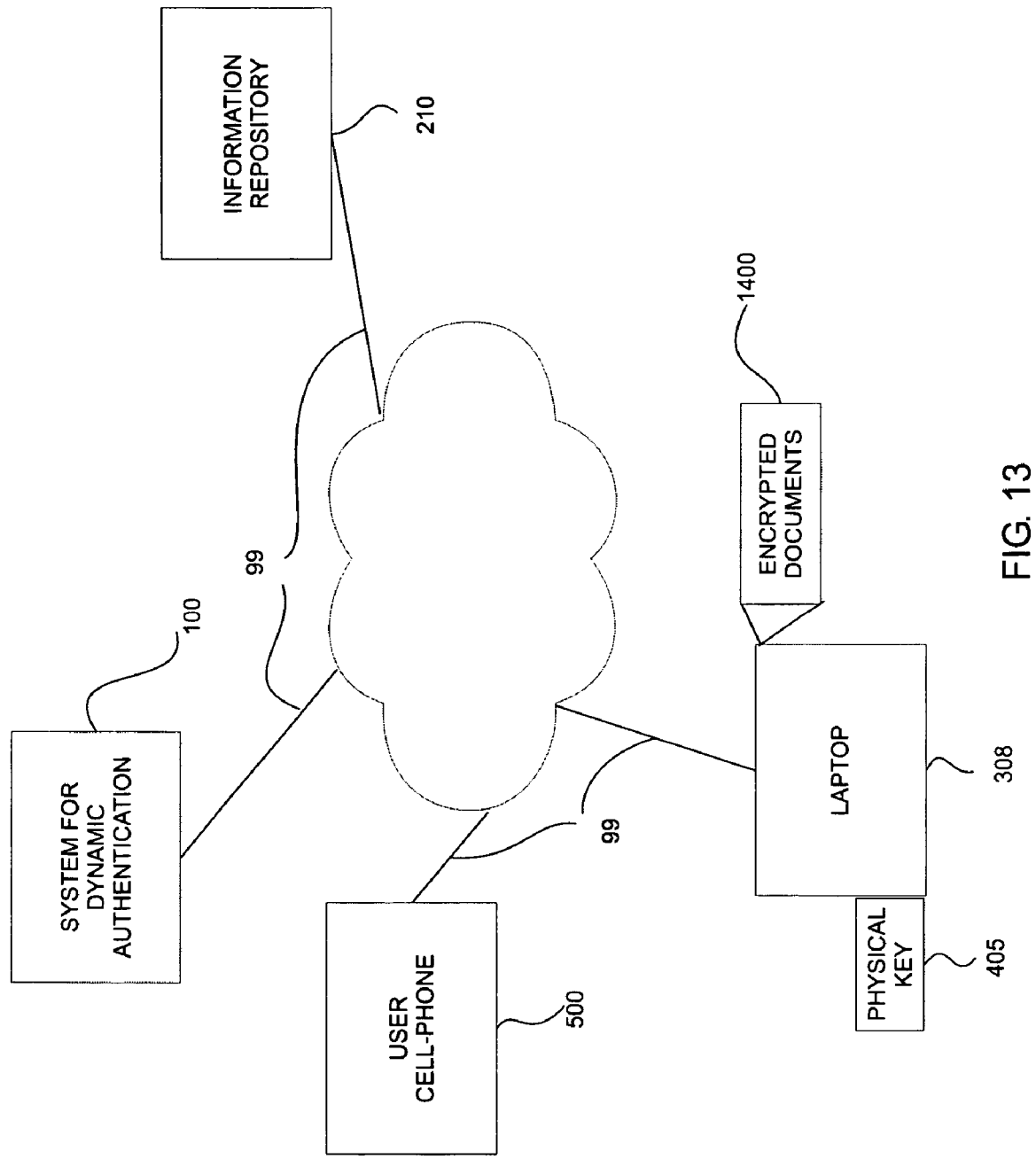
FIG. 13 is a sixth overview of the use of an exemplary dynamic authentication system according to this invention.

FIG. 13 is a sixth exemplary overview of the use of a dynamic authentication system 100 according to this invention. The system for dynamic authentication is connected via communications links 99 to an information repository 201, a user cell-phone 500; and a laptop computer 308 containing encrypted documents 1400.

The encrypted documents may be stored in the information repository 201, the physical key 405 and/or any location accessible via the communications link 99. A user is associated with a physical key 405 in a prior step. User specific information and/or services, such as digital library subscriptions, corporate documents, and the like are associated with the user's physical key 405.

In one embodiment, a laptop computer 300 is loaded with encrypted documents 1400. A corporate user having a valid physical key proposes a dynamic association with the corporate laptop guest device 308. The dynamic association is created by inserting the USB physical key 405 into the USB receptacle of the laptop guest device 308. However, any means of associating the physical key 405 and the laptop guest device 308 may also be used in the practice of this invention.

For example, inserting the USB physical key 405 may trigger the communication of the proposed dynamic association to the system for dynamic authentication over a first channel or communication link. The cell-phone user device 500 is then used to confirm the proposed association via a second channel or communication link. The system for dynamic authentication verifies that the user is permitted to retrieve the encrypted documents 1400 based on the list of information sources and/or services previously associated with the user.

An authentication message including a session identifier or temporary access key is forwarded to the laptop 308 if the user is a permitted user and the guest device is a valid device. The session identifier typically allows access for a transient period of time. If the laptop computer 308 is lost or stolen, the device identifier associated with the laptop computer is removed from the list of valid guest devices associated with the user and/or the user's physical key. The removal of the device identifier prevents access to the encrypted documents 1400 stored on the laptop computer 308 since a valid session identifier can no longer be generated even in the presence of a stolen physical key 405. Revoking and/or otherwise updating a user's access rights to the encrypted documents is accomplished by removing and/or adjusting the previously determined associations between users, physical keys and user devices.

It will be apparent that in various other exemplary embodiments according to this invention, the encrypted documents may be located on the physical key 405, the laptop computer 308, the information repository 201 and/or any other location accessible via communications link 99.

Each of the circuits 10-80 of the system for dynamic authentication 100 described in FIG. 3 can be implemented as portions of a suitably programmed general-purpose computer. Alternatively, circuits 10-80 of the system for dynamic authentication 100 outlined above can be implemented as physically distinct hardware circuits within an ASIC, or using a FPGA, a PDL, a PLA or a PAL, or using discrete logic elements or discrete circuit elements. The particular form each of the circuits 10-80 of the system for dynamic authentication 100 outlined above will take is a design choice and will be obvious and predicable to those skilled in the art.

Moreover, the system for dynamic authentication 100 and/or each of the various circuits discussed above can each be implemented as software routines, managers or objects executing on a programmed general purpose computer, a special purpose computer, a microprocessor or the like. In this case, the system for dynamic authentication 100 and/or each of the various circuits discussed above can each be implemented as one or more routines embedded in the communications network, as a resource residing on a server, or the like. The system for dynamic authentication 100 and the various circuits discussed above can also be implemented by physically incorporating the system for dynamic authentication 100 into software and/or a hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the system for dynamic authentication 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of dynamic authentication of a guest device by an authentication system, the guest device being in communication with a user device controlled by a user, the method at the authentication system comprising:
    storing a first set of associations between users, user devices and physical keys;
    receiving, over a first communications channel, a proposed dynamic association between the guest device and a physical key based on presence of the physical key at or near the guest device;
    determining the user device corresponding to the physical key based on the first set of associations;
    receiving, over a second communication channel, a user confirmation of the proposed dynamic association from the user device; and
    authenticating the guest device based on the proposed dynamic association, the user confirmation, and the first set of associations for access to at least one of: information and services associated with the user of the user device,
    wherein the proposed dynamic association and information received by the guest device exclude information required for completing the authenticating of the guest device.

2. The method of claim 1, in which the first communications channel is provided by the physical key.

3. The method of claim 1, in which the first communications channel is provided by the guest device.

4. The method of claim 1, in which the physical key is further comprised of at least one of: a contact-based connector and a contact-less connector for connecting to the guest device.

5. The method of claim 4, in which the contact-based connector is at least one of: a USB port; a Memorystick port; a serial port; a parallel port; a Secure Card port; a compact flash card port; a smartcard port and a PC card port.

6. The method of claim 4, in which the contact-less connector is at least one of: a Bluetooth connector; an RFID connector; a WiFi connector; a WiMax connector; and an infra-red connector.

7. The method of claim 1, in which the user information is transformed before transmission to the guest device.

8. The method of claim 7, in which the transformation is at least one of: a copy-protection transformation applying a digital watermark and a steganographic transformation.

9. The method of claim 1, further comprising:
    determining a set of operable user devices and guest devices,
    wherein the set of operable user devices are guest devices is determined based on an access control list.

10. The method of claim 1, in which the guest device is at least one of:
    a land-line telephone, a voice-over-ip telephone, a personal digital assistant; a enabled music player; a radio-transmitter; a digital camera; a video camera; a personal music player; a personal video player, a television; a printer; and a computer.

11. The method of dynamic authentication according to claim 1, in which authenticating the guest device comprises the steps of:
- determining the user associated with the physical key;
- determining at least one data service associated with the physical key;
- authenticating user access to the data service based on the dynamic authentication of the guest device.

12. The method of claim 11, in which the data service is a repository of information contained on a computer.

13. The method of claim 12, in which the computer is at least one of: a portable computer; a non-portable computer.

14. The method of claim 13, in which the non-portable computer is at least one of: a server; a corporate server; an information repository and a digital library.

15. The method of claim 1, in which the user information and services are encrypted and decrypted based on the authentication.

16. The method of claim 15, in which the decryption is temporary.

17. The method of claim 1, in which the user information and services are located in at least one of: the physical key, the guest device, and a remote location.

18. The method of claim 1, in which the first set of associations is modified to change the authentications rights.

19. The method of claim 1, in which the confirmed dynamic association is associated with a session identifier supported by at least one of the user device and the physical key.

20. The method of claim 19, wherein the session identifier is verified at time intervals that are variable.

21. A system of dynamic authentication of a guest device comprising:
- a memory for storing a first set of associations between users, user devices and physical keys;
- an input/output circuit for receiving, over a first communications channel, a proposed dynamic association between the guest device and a user associated with a physical key based on presence of the physical key at or near the guest device, and for receiving from a user device, associated with the user, a user confirmation of the proposed dynamic association over a second communication channel; and
- a processor for determining the user device corresponding to the physical key based on the first set of associations and for authenticating the guest device based on the dynamic association, the user confirmation, and the first set of associations, the guest device being authenticated for receiving at least one of: information and services associated with the user,
- wherein the proposed dynamic association and information received by the guest device exclude information required for completing the authenticating of the guest device.

22. The system of claim 21, in which the first communications channel is provided by the physical key.

23. The system of claim 21, in which the first communications channel is provided by the guest device.

24. The system of claim 21, in which the physical key is further comprised of at least one of: a contact-based connector and a contact-less connector for connecting to the guest device.

25. The system of claim 24, in which the contact-based connector is at least one of: a USB port; a Memorystick port; a serial port; a parallel port; a Secure Card port; a compact flash card port; a smartcard port and a PC card port.

26. The system of claim 24, in which the contact-less connector is at least one of: a Bluetooth connector; an RFID connector; a WiFi connector; a WiMax connector; and an infra-red connector.

27. The system of claim 21, in which the user information is transformed before transmission to the guest device.

28. The system of claim 27, in which the transformation is at least one of: a copy-protection transformation applying a digital watermark and a steganographic transformation.

29. The system of claim 21,
- wherein the user device is verified based on a first user-specific access control list, and
- wherein the guest device is verified based on a second user-specific access control list.

30. The system of claim 21, in which the guest device is at least one of: a land-line telephone, a voice-over-ip telephone, a personal digital assistant; a enabled music player; a radio-transmitter; a digital camera; a video camera; a personal music player; a personal video player, a television; a printer; and a computer.

31. The system of claim 21 wherein the physical key includes a physical key identifier that identifies the physical key; and a connector for proposing a dynamic association with a guest device based on the physical key identifier.

32. The system of claim 31, in which the connector is at least one of: a contact-based connector and a contact-less connector.

33. The system of claim 31, in which the physical key comprises a first communication link operable to communicate the proposed dynamic association.

34. The system of claim 21, in which the user information and services are encrypted and decrypted based on the authentication.

35. The system of claim 34, in which the decryption is temporary.

36. The system of claim 21, in which the user information and services are located in at least one of: the physical key, the guest device, and a remote location.

37. The system of claim 21, in which the first set of associations is modified to change the authentications rights.

38. The system of claim 21, wherein the confirmed dynamic association is associated with a session identifier supported by at least one of the user device and the physical key.

39. The system of claim 21, wherein the session identifier is verified at time intervals that are variable.

40. A computer readable storage medium comprising computer readable program code embodied on the computer readable storage medium, the computer readable program code useable to program a computer to dynamically authenticate guest devices by a method comprising:
- storing a first set of associations between users, user devices and physical keys;
- receiving over a first communications channel, a proposed dynamic association between a guest device and a physical key based on presence of the physical key at or near the guest device;
- determining the user device corresponding to the physical key based on the first set of associations;

receiving over a second communication channel, a user confirmation of the proposed dynamic association from the user device; and authenticating the guest device based on the proposed dynamic association, the user confirmation, and the first set of associations for access to at least one of: information and services associated with the user, wherein the proposed dynamic association and information received by the guest device exclude information required for completing the authenticating of the guest device.

* * * * *